March 12, 1929.  B. SAHL  1,704,842

AUTOMOBILE LOCK

Filed April 16, 1928

Inventor:
Barney Sahl.
by his atty
Charles S. Gooding.

Patented Mar. 12, 1929.

1,704,842

UNITED STATES PATENT OFFICE.

BARNEY SAHL, OF BOSTON, MASSACHUSETTS.

AUTOMOBILE LOCK.

Application filed April 16, 1928. Serial No. 270,242.

This invention relates to a lock for automobiles and has for its object to provide a keyless type of device which may be applied to the emergency brake lever of an automobile and interlock with the release rod of said lever in a manner to prevent a pawl operated by the release rod from becoming disengaged from its ratchet.

Another object of the invention is to provide a means for breaking the ignition circuit of the automobile when the emergency brake is locked, thereby making it impossible to operate the engine of the automobile.

Still another object of the invention is to provide a casing for the lock which is attached to the hand lever upon the inside of the casing, the latter embodying therein two casing members which are fastened together by a locking mechanism which is operated by the same mechanism which throws the bolt to permit the hand lever to be operated, it being impossible to obtain access to the interior of the casing when the hand lever is locked.

The invention consists in a lock for automobiles as set forth in the following specification and particularly as pointed out in the claim thereof.

Referring to the drawings.

Like numerals refer to like parts throughout the several views of the drawings.

Figures 5, 6:
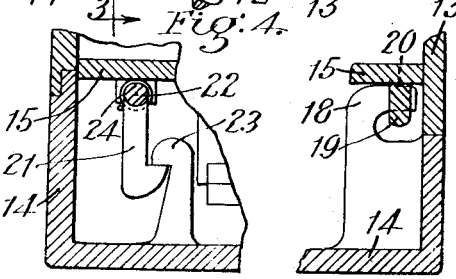
Figs. 5 and 6 are detail sectional views illustrating the mechanism for locking the casing members together.

In the drawings, 10 represents an emergency brake lever and 11 represents a release rod for said lever. The lever 10 may be of any of the well known types of hand levers which employ a release rod mounted upon the exterior of the lever for operating the usual locking pawl. Mounted at any suitable location upon the lever 10 is a casing 12 embodying therein casing members 13 and 14. A plate 15 is rigidly secured by suitable screws to the casing member 13 and the latter is rigidly clamped by means of a clamping block 16 and screws 17 to the lever 10. The casing member 14 is provided at one end thereof with hook portions 18 which engage a flange 19 formed integral with the plate 15, said hook portions projecting into openings 20 provided in the flange 19, see Fig. 5. At the opposite end of the plate 15 from that upon which the flange 19 is located is a latch 21 pivoted at 22 to said plate and said latch interlocks with a catch 23, formed integral with the casing member 14, see Fig. 6. A helical spring 24 surrounding one of the arms comprising the pivot portion 22 of the latch 21 acts to normally hold said latch in engagement with the catch 23.

Figure 1:
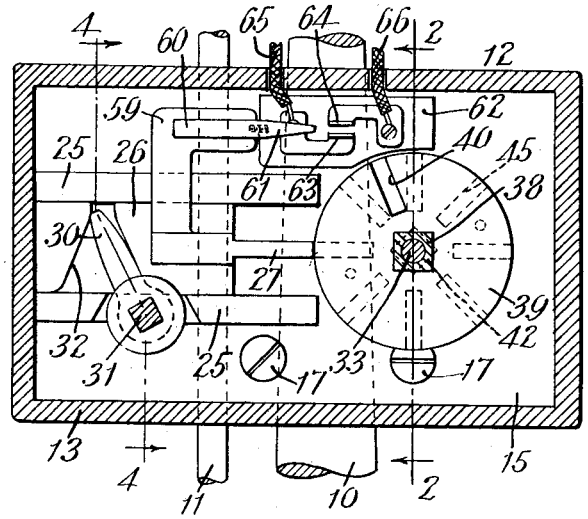
Figure 1 represents a vertical sectional elevation as taken on the line 1—1 of Fig. 2 looking in the direction of the arrows on said line.
Figure 2:
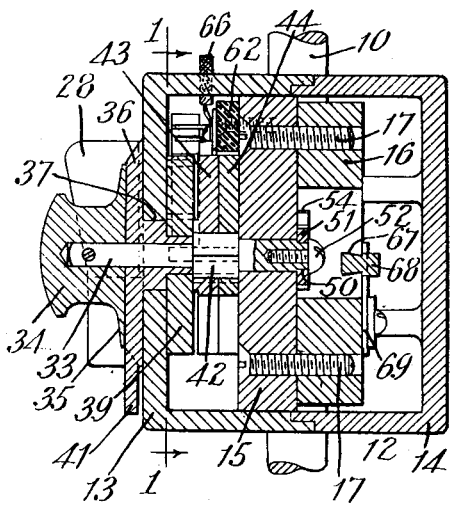
Fig. 2 is a transverse section taken on the line 2—2 of Fig. 1 looking in the direction of the arrows on said line.

Slidably mounted in guideways 25 formed upon the plate 15 is a bolt 26, at one end of which is a tongue 27. The bolt 26 is operated by a handle 28 which is rigidly fastened to a shaft 29 mounted to rock in the casing member 13 and plate 15. A finger 30 is mounted upon a squared portion 31 of the shaft 29, and said finger projects into a V-shaped slot 32 which is provided in the side of the bolt 26, see Fig. 2.

The mechanism which holds the bolt 26 in its locked position and which permits the bolt to be released is as follows:—Rotatably mounted in the plate 15 and projecting therefrom outwardly through the casing member 13 is a shaft 33, at the outer end of which a handle 34 is rigidly secured. The handle 34 has a flange 35 formed integral therewith upon the front surface of which suitable graduations or indicating lines and numerals may be placed. Rotatably mounted upon the shaft 33 is a dial member 36, a portion of which is located between the flange 35 of the handle 34 and the outer surface of the casing member 13. The dial 36, furthermore, has a bearing portion 37 which is located within an opening provided therefor in the casing member 13.

Mounted upon a squared portion 38 of the dial member 36 is a disc 39 having a radially disposed slot 40 extending inwardly from the periphery thereof. The dial member 36 is provided with any suitable form of graduations and indicating numerals and is operated by means of a finger piece 41 which projects outwardly from the periphery thereof.

Mounted upon a squared portion 42 of the shaft 33 are discs 43 and 44, the former being provided with a plurality of radial slots 45 extending inwardly from the periphery thereof, and the disc 44 being provided with a single radial slot 46. The disc 43 is rotated in unison with the shaft 33 and has pins 47 projecting laterally from one face thereof and adapted to project into holes 48 provided in the disc 44 and the latter is provided with a circular opening 49 upon its axis to permit it to rotate upon the corners of the squared portion 42 of the shaft 33 in order that the slot 46 may be aligned with any one of the slots 45 of the disc 43, the combination of the lock being varied by moving the disc 44 relatively to the disc 43, both of which are rotated in unison when the shaft is rotated by means of the pins 47. When the discs 39, 43 and 44 are rotated into a position so that the slot 40 of the disc 39 aligns with the slot 46 of the disc 44 and its co-operating slot 45 of the disc 43, and all of these slots align with the tongue 27 of the bolt 26, the bolt may be operated to move the tongue 27 into the aligning slots.

Figure 3:
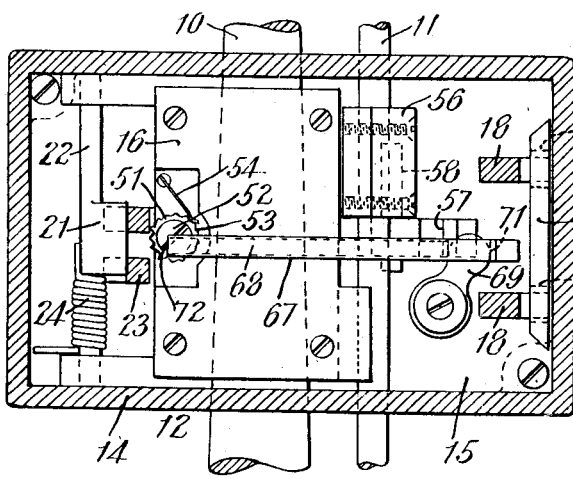
Fig. 3 is a vertical sectional elevation taken on the line 3—3 of Fig. 4 looking in the direction of the arrows on said line.
Figure 4:
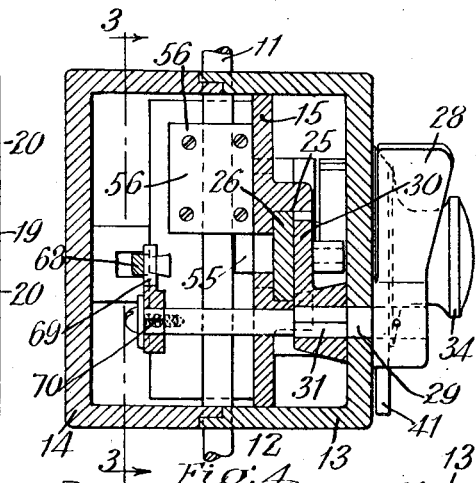
Fig. 4 is a transverse section taken on the line 4—4 of Fig. 1 looking in the direction of the arrows on said line.
Figure 7:
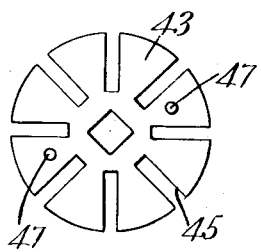
Figs. 7 and 8 are detail views of two of the locking discs.
Figure 8:
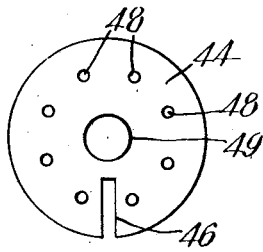

A means is provided for preventing the handle 34 from turning during the manipulation of the dial member 36 as follows:—Located upon a squared portion 50 of the shaft 33 is a disc 51, said disc being fastened to the squared portion of said shaft by means of a screw 52. The disc 51 is provided with a pluraliy of notches 53 in the periphery thereof and a spring 54 is mounted upon the plate 15 and engages the notches 53 as illustrated in Fig. 3.

In manipulating the combination, it is preferable to first turn the handle 34 until the slot 40 of the disc 39 aligns with the tongue 27 of the bolt 26, it being understood that this position is known only to the owner of the vehicle upon which the lock is mounted. The shaft 33 now being held by means of the spring 54, it is not necessary for the person manipulating the lock to thereafter hold the handle 34 and he may then rotate the dial member 36 by grasping the finger piece 41 and rotating said dial member until the slot 46 of the disc 44 and co-operating slot 45 of the disc 43 also align with the tongue 27 of the bolt 26.

In the locked position of the bolt 26, a projection 55 of said bolt is located in the path of a stop 56 which is clamped to the release rod 11, and when the stop 56 is located in the path of the projection 55 it is impossible to operate the release rod. When the bolt 26 is moved into a position to unlock the release rod, a slot 57 provided in the bolt will be located in alignment with a projection 58 formed upon the stop 56, see Fig. 3, and when the handle of the release rod is grasped in a well known manner to operate said rod, the projection 58 will pass downwardly through the slot 57.

The mechanism for opening and closing the ignition circuit of the automobile is as follows:—Formed integral with the bolt 26 is an arm 59 carrying an insulating member 60 in which a contact member 61 is mounted. An insulating member 62 is mounted upon the plate 15, and flexible electric contact members 63 and 64 are attached to this insulating member. Wires 65 and 66 connect with the electric contact members 63 and 64 respectively. When the bolt 26 is located in a position to lock the release rod 11, the electric contact member 61 will be withdrawn from between the contact members 63 and 64 and the electric circuit between said members will be broken. When, however, the bolt 26 is moved into a position to allow the release rod 11 to be operated, the contact member 61 will be located between the electric contact members 63 and 64, thereby closing the electric circuit between said members.

The mechanism for operating the locking mechanism for the casing members 13 and 14 so that the casing member 14 may be removed from the casing member 13 in order that access may be had to the interior of the casing is as follows:—Located within a groove 67 in the clamping blocks 16 is a slide 68, and an arm 69 rigidly fastened to a squared end portion 70 of the shaft 29 projects into a slot 71 provided in the slide 68. An end 72 of the slide 68 is located in the path of the latch 21 but normally the operation of the handle 28 to permit the operation of the release rod 11 is not sufficient to move the slide 68 into contact with the latch 21. When it is desired to unlock the casing members, the handle 28 is operated in the same direction as it is operated to unlock the release rod 11, but said handle is moved until the extremity 72 of the slide 68 pushes the latch 21 out of engagement with the catch 23, at which time the casing member 14 is removed from the casing member 13 and the latter with all of the mechanism of the lock remains upon the lever 10. The handle 28 is then rotated in a reverse direction until the slot 57 of the bolt aligns with the projection 58 of the stop 56.

The general operation of the locking mechanism hereinbefore specifically described is as follows:—When it is desired to lock the automobile, the handle of the release rod 11 is grasped and operated to move the release rod upwardly until the stop 56 is located above the upper surface of the bolt 26 and the latter is moved into a position to obstruct the downward movement of said release rod by manipulating the handle 28 a sufficient amount to disengage the tongue 27 of the bolt from the discs 39, 43 and 44 and the latter are operated to move the slots thereof out of alignment with the tongue 27 by manipulating the handle 34 and dial member 36. At the same time that the bolt 26 is operated to lock the release rod, the ignition circuit of the automobile is broken by disengaging the electric contact member 61 from the electric contact members 63 and 64.

When it is desired to again unlock the car, the handle 34 is rotated to position a graduation or combination number known only to the operator of the vehicle in alignment with a predetermined point indicated upon the front of the casing member 13, and when the handle 34 is correctly positioned, the dial member 36 is likewise manipulated to its proper position. At this time the various slots of the discs will be located in alignment with each other and the handle 28 may then be operated to move the tongue 27 of the bolt 26 into the slots of the discs. The handle 28 is then moved a sufficient distance for the slot 57 of the bolt 26 to align with the projection 58 of the stop 56. At this time the release rod 11 may be operated to release the emergency brake of the automobile and the ignition circuit of the automobile is closed. When it is desired to gain access to the interior of the lock, the handle 28 is manipulated as previously described.

It will be noted that the fastening means utilized for attaching the lock to the lever 10 is located within the casing 12 and the latter cannot be removed from the lever 10 without first removing the casing member 14, and it is necessary to be familiar with the combination of the lock in order to gain access to the interior of the casing.

I claim:

A locking device of the character described having, in combination, an operating lever, a release rod therefor, a casing mounted upon said lever, a bolt slidably mounted within said casing and adapted to obstruct the movement of said release rod, and a rotatable member mounted in said casing adapted to obstruct the movement of said bolt and thereby lock the release rod, said rotatable member being provided with a slot therein, adapted to be aligned with said bolt into which said bolt may be moved, thereby permitting the operation of the release rod.

In testimony whereof I have hereunto set my hand.

BARNEY SAHL.